April 19, 1966        E. G. BAILEY        3,246,968
PROTECTION AGAINST GAS EXPLOSIONS
Filed July 5, 1963
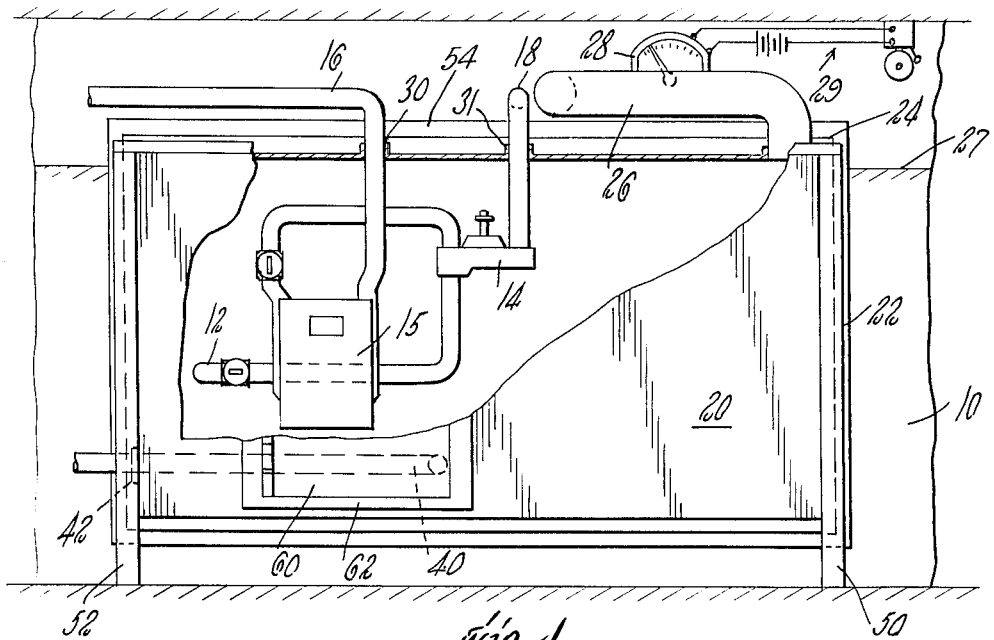
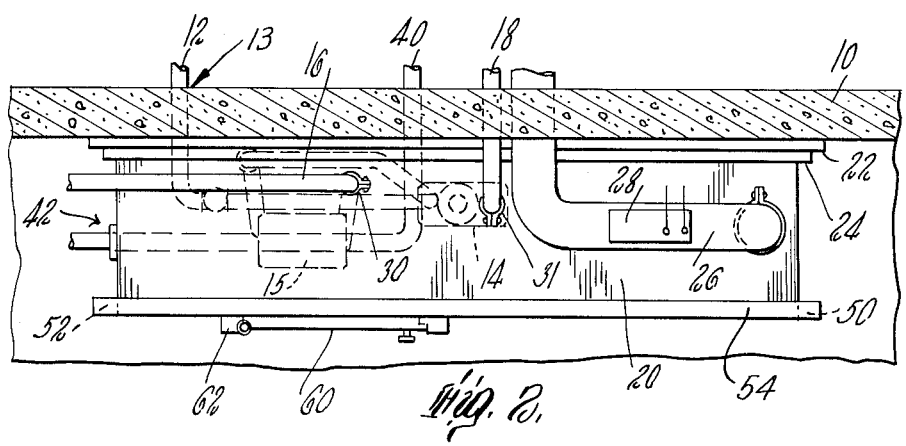
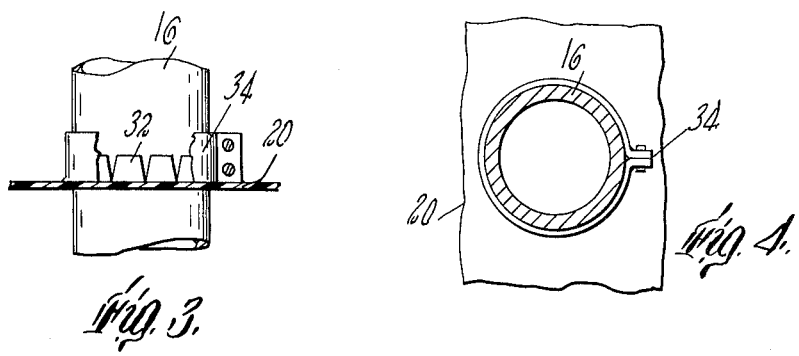

United States Patent Office 3,246,968
Patented Apr. 19, 1966

3,246,968
PROTECTION AGAINST GAS EXPLOSIONS
Ervin G. Bailey, Bethlehem Township, Pa., assignor to Bailey Inventions, Inc., Bethlehem Township, Pa., a corporation of Pennsylvania
Filed July 5, 1963, Ser. No. 292,967
4 Claims. (Cl. 48—193)

This invention relates to the protection of buildings from gas explosions caused by leakage of gas into the building through underground channels.

Leakage of natural gas from broken gas supply mains in city streets has become more common than it was a few years ago, very likely due to the ever increasing number of installations and a variety of construction details now used. During the winter months in freezing climates, the frozen ground acts as a gas impervious cap, causing gas leaking from broken mains to build up a pressure directing it horizontally beneath the frozen ground through any channels of least resistance. Oftentimes these channels follow underground gas, water, telephone, electricity, or other utility conduits from the street into neighboring buildings, since such conduits are not always properly sealed through the building foundations. Some building foundation walls are cracked or porous enough for leakage to penetrate the wall itself.

There have been several newspaper accounts of tragic residential explosions caused by underground gas leakage into houses, which had either open flame pilot gas burners or electrical fuel oil spark ignition systems, which ignited the gas leaking into and accumulating in the houses.

It is accordingly a primary object of this invention to provide a means disposed within the building for collecting and containing gas leaking into the building below ground level, and thereby prevent dispersion of the gas throughout the cellar of the building. To this end, I seal around all of the conduit entry holes through the foundation, a gas impervious plastic film or plastic film laminate bag into which any gas leaking through the wall will be collected and directed safely to a suitable outlet conduit and discharged out of doors. The plastic bag has a connection leading either to a conduit discharging above ground level back through the foundation wall or discharging internally of the building into a chimney, if available. In addition, the discharge conduit may be supplied with a flowmeter which will give a visual or audible alarm signal when gas flow occurs, so as to attract attention and thereby permit prompt steps to be taken by those responsible for correcting the leakage condition. The flowmeter can also be connected in such a way as to extinguish any possible source of ignition.

If the building supply conduits are relatively close together, the plastic bag can be large enough to encompass a series of entry conduits. It is best to cover the entire wall next to any possible leakage into the building from any adjacent gas supply main in the street or environment.

The invention may be more readily understood when described in connection with the accompanying drawings, wherein:

FIG. 1 is an elevational view of an installation in accordance with the invention;

FIG. 2 is a cross-sectional view thereof;

FIG. 3 is a detailed fragmentary view of one form of seal; and

FIG. 4 is a plan view of the seal shown in FIG. 3.

In the drawings, 10 represents a building foundation wall through which a gas supply pipe 12 passes and wherein the construction is such that there is sufficient space 13 around the line through the wall to permit gas leakage around the pipe between the pipe and the wall. The pipe 12 leads through a pressure regulator 14 into a conventional gas meter 15 and thence through pipe 16 to house use. The vent 18 from the regulator 14 passes through the wall and discharges excess pressure out of doors.

20 is a closed plastic film bag of generally rectangular shape having an open side with the marginal portions of its open side being bent outwardly and clamped between furring 22 sealed to the interior surface of the wall and metal straps 24 fastened to the furring. The main frame is held firmly to the wall with expansion type anchor bolts and cemented filler. Adhesives may be used to complete the seal if necessary.

The top wall of the bag has an aperture receiving the end of a conduit 26 which leads back out through wall 10 above the ground level indicated at 27 in FIG. 1. The conduit 26 incorporates a flowmeter 28 for indicating gas flow within the conduit 26. The flowmeter may be connected to an electrical alarm circuit 29 (shown in FIG. 1 only) which is energized when the flowmeter is actuated by any substantial flow.

The bag 20 is sealed around the pipe 16 at 30. This may be accomplished by slitting the plastic material, bending back the tabs 32 as indicated in FIG. 3 and and then clamping the turned back portions around the periphery of the pipe 16 as by a split ring clamp 34, cementing where necessary to perfect the seal. A similar seal is made around vent 18 at 31.

Also shown in FIGS. 1 and 2 is a water supply pipe 40 which may be enclosed within the same bag 20 and which at its egress from the bag at 42 can be provided with the same type of clamping seal 34 or other suitable seal.

Instead of leading the discharge conduit back out through the wall 10, it may lead to a chimney for discharge of the gas into the chimney.

It will be understood that the bag may be further supported as through adhesive or other fastening to a rigid framework including uprights 50, 52 and cross-beam 54. Moreover an access door 60 may be sealed into one wall of the bag 20 through a door frame 62 hung from cross-beam 54.

Thus, despite the presence of open flame pilots or spark ignition systems in the building, any gas leaking along the conduits 12 or 40 or otherwise leaking through the wall behind the bag 20 will be harmlessly by-passed to the outdoors above ground level and thus prevent an explosion that certainly would occur in the absence of the collecting bag installation.

What is claimed is:

1. In combination with a building foundation having a supply conduit piercing the foundation wall below the outside ground level, a gas impervious plastic bag for collecting any gas leaking through said wall adjacent said conduit, said bag having an open side, the marginal edges of the open side of said bag being sealed gas-tight to the interior surface of said foundation wall along a closed path spaced from the hole admitting said conduit through said wall, said plastic bag being sealed gas-tight around said conduit at a point along said conduit spaced from said wall, and a discharge conduit sealed gas-tight to said bag leading out of said bag and communicating with an above ground level opening for discharging excess gas collected in said plastic bag into the atmosphere outside said building without dissipation beyond the bag into the interior of the building.

2. The combination as claimed in claim 1, wherein a flowmeter is incorporated in said discharge conduit for visually indicating a gas flow condition through said discharge conduit.

3. The combination as claimed in claim 2, wherein said flowmeter is connected to an alarm for audibly indicating a gas flow condition through said discharge conduit.

4. The combination as claimed in claim 1, wherein the building foundation has at least two supply conduits passing separately therethrough and said plastic bag encompasses the holes around both said conduits and is sealed gas-tight around both conduits at points spaced along said conduits from said wall.

No references cited.

NEIL C. READ, Primary Examiner.

THOMAS B. HABECKER, Examiner.

D. K. MYER, Assistant Examiner.